United States Patent [19]

Horiba et al.

[11] Patent Number: 4,457,987
[45] Date of Patent: Jul. 3, 1984

[54] LIQUID FUEL CELL

[75] Inventors: Tatsuo Horiba, Hitachi; Seizi Takeuchi, Hitachiota; Kahki Tamura, Hitachi; Go Kawamura; Tetsuichi Kudo, both of Tokyo, all of Japan

[73] Assignee: Hitachi, Ltd., Tokyo, Japan

[21] Appl. No.: 419,307

[22] Filed: Sep. 17, 1982

Related U.S. Application Data

[63] Continuation-in-part of Ser. No. 212,139, Dec. 2, 1980, abandoned.

[30] Foreign Application Priority Data

Dec. 4, 1979 [JP] Japan .................................. 54-157801

[51] Int. Cl.³ ............................................. H01N 4/86
[52] U.S. Cl. .......................................... 429/41; 429/42
[58] Field of Search ................................... 429/27-29, 429/36, 40-46

[56] References Cited

U.S. PATENT DOCUMENTS

| | | | |
|---|---|---|---|
| 3,212,930 | 10/1965 | Thompson et al. | 429/42 X |
| 3,416,965 | 12/1968 | Boies et al. | 429/40 X |
| 3,423,247 | 1/1969 | Darland, Jr. et al. | 429/40 |
| 3,870,565 | 3/1975 | Bonnemay | 429/27 |
| 3,977,901 | 8/1976 | Buzzelli | 429/40 |
| 4,185,145 | 1/1980 | Breault | 429/44 X |

Primary Examiner—Charles F. LeFevour
Attorney, Agent, or Firm—Antonelli, Terry & Wands

[57] ABSTRACT

A liquid fuel cell including an anode made of carbon powders, which contains therein an electrode catalyzer and is adapted to be supplied with a liquid fuel, a cathode supplied with oxygen, and a separator interposed between the anode and the cathode. In order to improve cell performance, the anode is formed from carbon powders bonded with a binder, the carbon powders having particle sizes passing through a 50 Tyler mesh screen, in which at least thirty percent by volume of the carbon powders are unable to pass through a 100 Tyler mesh screen.

7 Claims, 2 Drawing Figures

LIQUID FUEL CELL

CROSS-REFERENCE TO RELATED APPLICATION

This is a continuation-in-part of application Ser. No. 212,139 filed on Dec. 2, 1980 abandoned.

BACKGROUND OF THE INVENTION

The present invention relates to a liquid fuel cell employing a liquid fuel.

In general, fuel cells are classified into gas fuel cells and liquid fuel cells in accordance with whether a fuel supplied to its anode is a gas such as hydrogen or a liquid such as methanol. An oxidizer, which may be a gas or liquid, is supplied to a cathode of the gas or liquid fuel cell. The cathode or anode supplied with a gas as the oxidizer or fuel may be called "gas electrode".

An electrode of carbon powders solidified with a binder has been well known, as disclosed in Japanese Patent Publication No. 17692/70, which is high in chemical stability (that is, high in resistance to both acid and alkaline solutions), small in weight, and high in cell performance. For fabricating the disclosed carbon electrodes, however, a complicated step must be taken which comprises a step of making large secondary particles from fine carbon powders through bridging or aggregation of the powders. The secondary particles are molded under pressure. Further, it has been generally considered that it is advantageous to employ fine carbon powders, (for example, carbon powders having passed through a 500 Tyler mesh) since a large specific or effective surface area is obtained in the electrode and the cell performance is thereby improved. British Patent No. 136,1741 has proposed a gas electrode which is made of press-molded carbon powders of 5-100 $\mu$m and has the pore sizes of 0.5-20 $\mu$m and a porosity of 5-50% for providing a large specific surface area.

However, the present inventors' experiments have revealed that when fine carbon powders are used for an anode of a liquid fuel cell in which a gas such as $CO_2$ is generated at the anode as the product of an electrode or cell reaction, there is a problem that the fine carbon powders prevent the reaction gas from escaping to the outside of the anode and therefore the supply of the liquid fuel to the cell through the anode becomes incomplete, thereby deteriorating the cell performance.

The use of relatively larger carbon powders for a gas electrode has been disclosed in U.S. Pat. No. 3,423,247. This patent shows a non-homogeneous two-layer electrode structure which includes a gas-permeable and electrolyte-repellant layer zone of larger carbon powders of 147-74 $\mu$m ($-65+100$ Tyler mesh) at the gas supply side and an electrolyte-permeable layer zone of smaller carbon powders not larger than 208 $\mu$m ($-200$ Tyler mesh) at the electrolyte side. The electrode is fabricated through a press-molding and heating process. The electrolyte-repellant zone has the pore sizes in the range of 1-20 $\mu$m and the electrolyte-permeable zone has the pore sizes in the range of 0.1-1 $\mu$m. The electrolyte-permeable zone may include three layers having a first layer with carbon powders not larger than 43 $\mu$m ($-325$ Tyler mesh), a second layer with carbon powders of 74-43 $\mu$m ($-200+325$ Tyler mesh) and a third layer with carbon powders of 208-74 $\mu$m ($-65+200$ Tyler mesh). U.S. Pat. No. 3,423,247 suggests the use of such a gas electrode to an anode supplied with a gas fuel as well as a cathode supplied with an oxidizer. However, such a gas electrode, too, has the above-mentioned problem associated with the generation of a reaction gas when it is applied to an anode of a liquid fuel cell.

SUMMARY OF THE INVENTION

An object of the present invention is to provide a liquid fuel cell which an anode or fuel electrode of carbon powders free from the above-mentioned problem associated with the generation of a reaction gas and which is simple in fabrication thereof and has an excellent cell performance.

According to the present invention, there is provided a liquid fuel cell comprising an anode made of carbon powders carrying an electrode catalyzer, said anode being adapted to be supplied with a liquid fuel and having as a whole a homogeneous and porous structure which has a porosity of 65-85% and in which pores of 20-100 $\mu$m occupy at least thirty percent of the total pore volume of said porous structure, a gas-permeable cathode supplied with an oxidizer, a separator interposed between said anode and said cathode, and a casing for accomodating therein said anode, said cathode, said separator and an electrolyte, said electrolyte existing at least in said separator.

DESCRIPTION OF THE PREFERRED EMBODIMENTS

Figure 1:
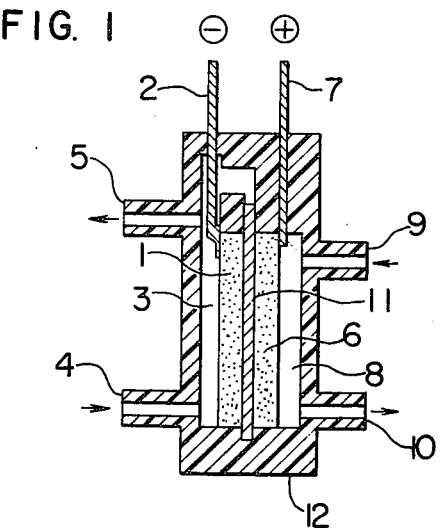
FIG. 1 is a sectional view showing an embodiment of a liquid fuel cell according to the present invention.

A liquid fuel cell of the present invention has embodied on the basis of the present inventors' revealed fact that if an anode of the liquid fuel cell made of carbon powders has a homogeneous and porous structure which has a porosity of 65-85% and in which thirty or more than percent of the total pore volume is occupied by pores of 20-100 $\mu$m, the cell performance can be remarkably improved. In other words, the present inventors have revealed that when a portion larger than seventy percent of the total pore volume is occupied by pores smaller than 20 $\mu$m, the permeability of the liquid fuel such as methanol through the anode is deteriorated and the escape of a gas such as $CO_2$ produced by a cell reaction is not sufficient, thereby significantly affecting the cell reaction. In the conventional gas electrodes made of carbon powders, it has been generally considered that the pore sizes not larger than 20 $\mu$m are preferable in view of a sufficient assurance of a specific surface area which contributes to the cell reaction (see the British Pat. No. 1361741 and the gas-permeable and electrolyte-repellant layer in the U.S. Pat. No. 3,423,247). The pore sizes of the electrolyte-permeable layer in the U.S. Pat. No. 3,423,247 are 0.1-1 82 m. However, the present inventors have found out that if pores of 20-100 $\mu$m occupy thirty or more than percent of the total pore volume, as mentioned above, a sufficient permeability of the liquid fuel through the anode and an easy escape of a reaction gas such as $CO_2$ to the outside of the anode are attained. If an anode is constructed with pores larger than 100 $\mu$m occupying a portion larger than thirty percent of the total pore volume has the porosity exceeding 85%, the anode results in a poor mechanical strength which cannot be put into a practical use.

The anode used in the present invention may be formed in such a manner that carbon powders which have their diameters not larger than 297 μm capable of passing through a 50 Tyler mesh but at least thirty percent by volume of which have their diameters larger than 149 μm not capable of passing through a 100 Tyler mesh, are bonded with a binder. Needless to say, all of carbon powders may have particle sizes within a range from 50 to 100 mesh. Further, the carbon powders may have any particle size distribution within a range from 50 to 100 mesh. In the case when carbon powders having particle sizes beyond the above-mentioned range have to be employed together with carbon powders having particle sizes within the range, it is desirable to avoid the use of carbon powders which cannot pass through a 50 mesh. The most preferable mixture is obtained by mixing one volume of carbon powders which can pass through a 50 mesh but cannot pass through a 100 mesh, with 0.5 to 1.5 volumes of carbon powders which can pass through a 200 mesh but cannot pass through a 325 mesh.

In the present invention, a well-known binder may be employed to bond together the carbon powders. Generally speaking, a resin having a high chemical resistance can advantageously be used as the binder. For example, fluororesin such as polytetrafluoroethylene, polyolefin resin such as polyethylene and polystyrene, polyvinyl chloride, or polyvinylidene chloride are useful. In general, 100 parts by weight of carbon powders are mixed with 10 to 35 parts by weight of such a binder.

The electrode may include a conductive support, for example, a netlike structure made of a metal or the like. The electrode is made, for example, in the following manner. The carbon powders mixed with the binder are adhered to the conductive support so that a base structure of porous electrode is formed. Then, an electrode catalyzer such as palladium and platinum is introduced into and carried in the base structure through an electrodeposition method to complete the fuel electrode.

A liquid fuel cell including the fuel electrode thus formed is shown in FIG. 1.

In FIG. 1, reference numeral 1 designates a porous anode or fuel electrode, 2 an anode terminal, 3 a liquid fuel chamber supplied with a fuel and an electrolyte, 4 an inlet for the fuel, 5 an outlet for the fuel, 6 a cathode or an oxidizer electrode formed generally of a porous carbon plate which is not required to contain the same carbon powders as the anode 1, 7 a cathode terminal, 8 an oxidizer chamber supplied with an oxidizer such as air or oxygen, 9 an inlet for the oxidizer, 10 an outlet for the oxidizer, 11 a separator interposed between and in close contact with the anode 1 and the cathode 6 and made of a fibrous base material such as asbestos paper, and 12 a casing or electrode frame made of a material having high resistance characteristic to acid and alkali such as acrylonitrile-butadiene-styrene copolymer and hard vinyl chloride resin. The cathode 6 may be formed of a porous plate of proper sintered metal materials.

Next, embodiments of the present invention will be explained.

As an embodiment 1, active coconut charcoal powders having their particle diameters of 298–149 μm which pass through a 50 Tyler mesh but cannot pass through a 100 Tyler mesh, as shown in Table I which will be shown later, was employed to form an anode or fuel electrode. About 5 ml of polyvinyl chloride latex (having a specific gravity of 1.13 and containing 55% polyvinyl chloride by weight) and 5 ml of water were added to and mixed with 10 cc of the coconut charcoal powders. The mixture was applied to a support made of a platinum wire gauze so that the platinum wire gauze supported 50 mg of coconut charcoal powders per square centimeter. Without any press-molding process, the wire gauze applied with the mixture was maintained at 100° C. for one hour to dry the mixture well enough. The wire gauze thus treated was then subjected to electrodeposition to introduce a platinum catalyzer into the mixture. The electrodeposition was carried out at a current density of 5 to 30 mA/cm$^2$ in a bath containing chloroplatinic acid ($H_2PtCl_6 \cdot 6H_2O$) at a concentration of 4 g/l and lead acetate ($Pb(CH_3COO)_2 \cdot H_2$) at a concentration of 0.08 g/l and maintained at a temperature of 50° to 90° C. Thus, there was formed an anode or fuel electrode containing 20 mg of platinum catalyzer per square centimeter.

Using the anode thus formed, a liquid fuel cell shown in FIG. 1 was fabricated.

Figure 2:
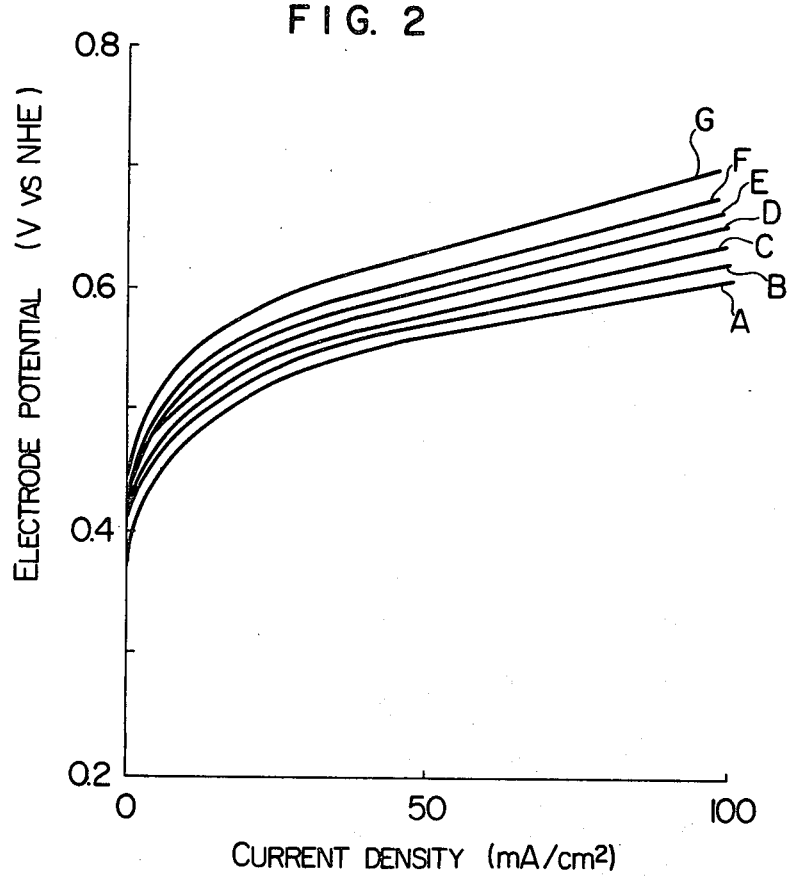
FIG. 2 is a graph for showing relations in respective anodes or fuel electrodes of liquid fuel cells between the current density and the electrode potential.

In order to know the performance of the cell, an aqueous solution containing sulfuric acid at a molar concentration of 3 mol/l and methanol fuel at a molar concentration of 1 mol/l was supplied to the fuel chamber, and air was supplied to the oxidizer chamber. Then, a relation at 25° C. between the current density and the electric potential of the anode was measured. The results of the measurement are shown as Curve B in FIG. 2. In FIG. 2, the abscissa represents the current density and the ordinate represents the potential of anode against normal hydrogen electrode (referred to as a V vs NHE in the figure).

Further, embodiments 2, 3 and 4 as well as experimental examples 1, 2, 3 and 4 for comparison were fabricated in the same manner as the embodiment 1, except that the particle size distribution of the coconut charcoal powders was changed, as shown in the Table I. The relations between the current density and the electrode potential measured for those embodiments and examples are also shown in FIG. 2.

The Table I also shows the porosity and the percent of 20–100 μm pores to the total pore volume for each anode. The porosity was determined from the measurement of an apparent specific gravity and the pore size distribution was measured by a mercury porosimeter.

TABLE I

| Sample | | Particle diameter D (μm) (Tyler mesh) | | | Porosity (%) | Percent of 20–100 μm pores (%) | Curve shown in FIG. 2 |
|---|---|---|---|---|---|---|---|
| | | 297 ≧ D > 149 (−50 +100 mesh) | 149 ≧ D > 74 (−100 +200 mesh) | 74 ≧ D > 44 (−200 +325 mesh) | | | |
| Embodiment | 1 | 10 cc | 0 | 0 | 76 | 40 | B |
| | 2 | 5 cc | 0 | 5 cc | 70 | 36 | A |
| | 3 | 3.5 cc | 3.5 cc | 3 cc | 67 | 30 | B |
| | 4 | 5 cc | 5 cc | 0 | 72 | 34 | C |
| Experi- | 1 | 0 | 10 cc | 0 | 62 | 21 | D |

TABLE I-continued

| Sample | Particle diameter D (μm) (Tyler mesh) | | | Porosity (%) | Percent of 20-100 μm pores (%) | Curve shown in FIG. 2 |
|---|---|---|---|---|---|---|
| | 297 ≧ D > 149 (−50 +100 mesh) | 149 ≧ D > 74 (−100 +200 mesh) | 74 ≧ D > 44 (−200 +325 mesh) | | | |
| mental Example | 2   0 | 0 | 10 cc | 56 | 14 | F |
| | 3   0 | 5 cc | 5 cc | 60 | 17 | E |
| | 4 | (−500 mesh) 10 cc | | 54 | 11 | G |

As is apparent from FIG. 2, the embodiments 1, 2, 3 and 4 of a fuel cell according to the present invention have such excellent cell performance as indicated by Curves A, B and C in FIG. 2. From the Table I and FIG. 2, it should be appreciated that it is preferable for an excellent cell performance that pores of 20-100 μm occupy at least thirty percent of the total pore volume and the porosity is at lowest 65%. But, the porosity higher than 85% occuring when pores larger than 100 μm occupy thirty percent of the total pore volume, is not preferred because of the resulting poor mechanical strength of anode.

Though the coconut charcoal powders were employed as carbon powders in the embodiments 1, 2, 3 and 4, glassy carbon powders or graphite powders may be employed in place of the coconut charcoal powders. In each of these cases, it was confirmed that the relation between the particle size of powders and the cell performance showed the same tendency as that obtained from the embodiments 1, 2, 3 and 4.

As is evident from the foregoing description, the anodes or fuel electrodes of the liquid fuel cells shown in the embodiments 1, 2, 3 and 4 can be fabricated by a simple manufacturing method as compared with the conventional electrodes. Moreover, it is possible to employ both of acidic and alkaline electrolytes. Further, the fuel cells shown in the embodiments can show excellent cell performance, since the active catalyzer for an electrode reaction is distributed uniformly in and adheres well to the anode or fuel electrode. Furthermore, the liquid fuel cell according to the present invention is scarcely cracked, and is excellent in withstand characteristic to heat cycle.

In the embodiments, methanol and sulfuric acid were used as the fuel and the electrolyte, respectively. However, hydrazine, formalin and formic acid may be used as the fuel, and such an acid as phosphoric acid and trifluoromethane sulfonic acid and such alkali as potassium hydroxide may be used as the electrolyte. In these cases, a fuel cell employed can show the same cell performance as the embodiments. Further, though the electrodeposited platinum black was used as the catalyzer in the embodiments, a palladium catalyzer or a binary catalyzer such as a platinum-tin catalyzer, a platinum-rhenium catalyzer, a platinum-ruthenium catalyzer, a platinum-gold catalyzer, a platinum-rhorium catalyzer and a platinum-indium catalyzer may be used as well known.

We claim:

1. A liquid fuel cell comprising:
   an anode made of carbon powders carrying an electrode catalyzer, said anode being adapted to be supplied with a liquid fuel and having as a whole a homogeneous and porous structure which has a porosity of 65-85% and in which pores of 20-100 μm occupy at least thirty percent of the total pore volume of said homogeneous and porous structure;
   a gas-permeable cathode supplied with an oxidizer;
   a separator interposed between said anode and said cathode; and
   a casing for accommodating therein said anode, said cathode, said separator and an electrolyte, said electrolyte existing at least in said separator.

2. A liquid fuel cell according to claim 1, wherein said carbon powders forming said anode have their particle diameters not larger than 297 μm which pass through a 50 Tyler mesh but at least thirty percent by volume of said carbon powders have their particle diameters larger than 149 μm which are unable to pass through a 100 Tyler mesh, and said carbon powders are bonded with a binder.

3. A liquid fuel cell according to claim 2, wherein said carbon powders contain one volume of carbon powders larger than 149 μm and not larger than 297 μm which pass through a 50 Tyler mesh but are unable to pass through a 100 Tyler mesh, and 0.5 to 1.5 volumes of carbon powders larger than 44 μm and not larger than 74 μm which pass through a 200 Tyler mesh screen but are unable to pass through a 325 Tyler mesh.

4. A liquid fuel cell according to claim 3, wherein said anode contains 100 parts of said carbon powders and 10 to 35 parts of said binder by weight.

5. A liquid fuel cell according to claim 4, wherein said binder is selected from the group consisting of polytetrafluoroethylene, polyethylene, polystyrene, polyvinyl chloride and polyvinylidene chloride.

6. A liquid fuel cell according to claim 1, further comprising means for feeding a liquid fuel to the anode.

7. A liquid fuel cell according to claim 6, wherein said means for feeding a liquid fuel to the anode feeds the liquid fuel to the surface of the anode opposite the surface adjacent the separator.

* * * * *

UNITED STATES PATENT AND TRADEMARK OFFICE
CERTIFICATE OF CORRECTION

PATENT NO. : 4,457,987
DATED : July 3, 1984
INVENTOR(S) : Tatsuo HORIBA et al

It is certified that error appears in the above-identified patent and that said Letters Patent is hereby corrected as shown below:

On the first page of the patent, left-hand column,
    line 2 of Item "[75]", delete "Kahki" and
    insert therefor -- Kohki --.

Signed and Sealed this

Twenty-fifth Day of June 1985

[SEAL]

Attest:

DONALD J. QUIGG

Attesting Officer
Acting Commissioner of Patents and Trademarks